US012808465B2

(12) United States Patent
Zhang et al.

(10) Patent No.: US 12,808,465 B2
(45) Date of Patent: Nov. 24, 2026

(54) PRESS-FITTING JOINT FOR COMBINED PIPELINE

(71) Applicant: NINGBO PUREY FLOW TECHNOLOGY CO., LTD., Ningbo (CN)

(72) Inventors: Jihong Zhang, Ningbo (CN); Qihao Zhang, Ningbo (CN)

(73) Assignee: NINGO PUREY FLOW TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/744,719

(22) Filed: Jun. 17, 2024

(65) Prior Publication Data

US 2024/0360926 A1 Oct. 31, 2024

Related U.S. Application Data

(63) Continuation of application No. PCT/CN2023/113553, filed on Aug. 17, 2023.

(30) Foreign Application Priority Data

Apr. 25, 2023 (CN) ........................ 202320950045.X
Jun. 10, 2023 (CN) ........................ 202321478613.7

(51) Int. Cl.
*F16L 13/14* (2006.01)

(52) U.S. Cl.
CPC .................................... *F16L 13/14* (2013.01)

(58) Field of Classification Search
CPC .... F16L 13/142; F16L 37/091; F16L 37/0925
See application file for complete search history.

(56) References Cited

U.S. PATENT DOCUMENTS 3,724,880 A * 4/1973 Seiler .................. F16L 37/0925
2012/0001414 A1* 1/2012 Arning .................. F16L 13/142
(Continued)

FOREIGN PATENT DOCUMENTS

CN 202756788 U 2/2013
CN 211449982 U 9/2020
(Continued)

OTHER PUBLICATIONS

International Search Report and Written Opinion for Corresponding PCT Application No. PCT/CN2023/113553.

*Primary Examiner* — Zachary T Dragicevich

(57) ABSTRACT

A press-fitting joint for combined pipeline includes a pipe coupling, a sealing ring, a gear ring and an elastic gasket. An inner face of the gear ring is provided with a plurality of embedded teeth arranged towards an axis, a press-fitting section of the pipe coupling is provided with a circumferential groove on an inner surface thereof, the sealing ring, the elastic gasket and the gear ring are mounted in the circumferential groove and arranged sequentially along an axial direction from an outer side to an inner side, an outer end face of the gear ring is axially matched with an outer sidewall of the circumferential groove, and an inner sidewall of the circumferential groove is axially matched with the sealing ring, outer circumferential faces of the gear ring, the elastic gasket and the sealing ring are in contact and matched with a bottom face of the circumferential groove.

9 Claims, 5 Drawing Sheets

(56) References Cited

U.S. PATENT DOCUMENTS

| | | | | |
|---|---|---|---|---|
| 2018/0313478 | A1* | 11/2018 | Lawrence ............. | F16L 13/142 |
| 2019/0067922 | A1* | 2/2019 | Platt ....................... | F16L 13/142 |
| 2020/0109805 | A1* | 4/2020 | He ........................ | F16L 13/142 |
| 2020/0300395 | A1* | 9/2020 | Paige ..................... | F16L 13/142 |

FOREIGN PATENT DOCUMENTS

| | | | | | |
|---|---|---|---|---|---|
| CN | 211667327 | U | | 10/2020 | |
| CN | 112178309 | A | | 1/2021 | |
| CN | 213332863 | U | | 6/2021 | |
| CN | 113898796 | A | | 1/2022 | |
| CN | 113970019 | A | | 1/2022 | |
| CN | 215674089 | U | | 1/2022 | |
| CN | 114352818 | A | | 4/2022 | |
| CN | 217502900 | U | | 9/2022 | |
| CN | 217502926 | U | | 9/2022 | |
| DE | 102009007303 | A1 | | 8/2010 | |
| NL | 2013426 | A | * | 8/2016 | .......... F16L 37/0925 |
| WO | 2020073188 | A1 | | 4/2020 | |

* cited by examiner

PRESS-FITTING JOINT FOR COMBINED PIPELINE

CROSS-REFERENCE TO RELATED APPLICATIONS

This application is a Continuation application of PCT Application No. PCT/CN2023/113553, filed on Aug. 17, 2023, which claims the priorities of Chinese patent application No. 202320950045.X, filed on Apr. 25, 2023, and Chinese patent application No. 202321478613.7, filed on Jun. 10, 2023, the entire contents of which are hereby incorporated by reference.

TECHNICAL FIELD

This application relates to the technical field of pipeline connection, and in particular to a press-fitting joint for combined pipeline.

BACKGROUND

Pipeline is a device connected by pipes, valves, etc. for transporting gases, liquids, or fluids with solid particles. Press-fitting joint is one of the press-fitting pipeline system, that is, adjacent pipes are connected by joint constructed as press-fitting connecting structure, which requires the use of press-fitting joint (also known as pipe fitting). A general pipe fitting includes a pipe coupling, which is sequentially equipped with a high-strength gear ring and a scaling ring in a press-fitting section (sealing and fastening section of the pipe) from the outer side to the inner side. During use of the pipe press-fitting connecting structure, firstly, the scaling ring and high-strength gear ring are placed in sequence, the pipe to be connected is then inserted, and then a press-fitting tool is used to make the press-fitting section be press-fitted. The sealing ring and high-strength gear ring are both compressed simultaneously, forcing the sealing ring inside a groove of the press-fitting section to be tightly attached to the pipe, so as to play a role in sealing and waterproof. The high-strength gear ring uses the reverse teeth on top to fasten the pipe, wherein a principle used is that of the reverse tooth, thereby achieving axial tensile resistance of the pipe. The pipeline system formed by such connection can introduce pressure fluid without causing leakage at the press-fitting connecting portion or disengagement from each other in the axial direction.

Applicant wishes to develop a new type of press-fitting joint for combined pipeline, which adopts the principle of embedding rather than the principle of reverse teeth to achieve press-fitting connection, with good reliability.

SUMMARY

A technical problem to be solved by this application is to provide a press-fitting joint for combined pipeline, which adopts the principle of embedding instead of the principle of reverse teeth to achieve press-fitting connection and has good reliability.

This application provides a press-fitting joint for combined pipeline, which includes a pipe coupling, a sealing ring, a gear ring and an elastic gasket, an inner face of the gear ring being provided with a plurality of embedded teeth which is arranged towards an axis, a press-fitting section of the pipe coupling being provided with a circumferential groove on an inner surface thereof, the sealing ring, the elastic gasket, and the gear ring being mounted in the circumferential groove on inner surface and arranged sequentially along an axial direction from an outer side to an inner side, an outer end face of the gear ring being axially matched with an outer sidewall of the circumferential groove on inner surface, and an inner sidewall of the circumferential groove on inner surface being axially matched with the sealing ring, an outer circumferential face of the gear ring, an outer circumferential face of the elastic gasket, and an outer circumferential face of the sealing ring being in contact and matched with a bottom face of the circumferential groove on inner surface.

In this technical solution, during press-fitting, the scaling ring, the elastic gasket and the gear ring are compressed simultaneously, and are axially limited between the outer and inner sidewalls of the circumferential groove on inner surface, that is, the sealing ring, the clastic gasket and the gear ring are axially limited in the circumferential groove on inner surface. In this way, with compression, on the one hand, the sealing ring and the elastic gasket are flattened to a certain extent, forming a good fit with the outer wall of the pipe; on the other hand, due to the axial limit for the sealing ring and the elastic gasket and the effect of the embedded teeth, the embedded teeth of the gear ring are generally controlled to be radially embedded into the outer wall of the pipe, thereby achieving the connection effect of tensile resistance through embedding. That is, the pipe is firmly locked in the press-fitting section and cannot move axially or rotate circumferentially, so that connection strength is high. At the same time, due to the separation of the elastic gasket, the gear ring will not damage the scaling ring during press-fitting. In addition, if the elastic gasket remains intact after press-fitting, the attachment of the elastic gasket further plays a role in enhancing the sealing. In summary, this application adopts the principle of embedding instead of the principle of reverse teeth to achieve press-fitting connection, and has good reliability.

Further, the elastic gasket is a rubber ring. In this way, the elastic gasket has good elasticity, not only playing a role in separating and protecting the inner sealing ring, but also participating in scaling.

Further, the outer circumferential face of the gear ring is provided with a position-avoiding face which is narrowed circumferentially at a portion thereof adjacent to the outer end face. In this way, the avoidance surface is beneficial for reducing the perpendicularity requirement for producing the outer sidewall during producing of the circumferential grooves on inner surface, thereby reducing the difficulty of processing.

Further, each of the embedded teeth is set to avoid a portion of the inner face of the gear ring corresponding to the position-avoiding face. In this way, it is beneficial for avoiding weak areas, thereby enhancing reliability.

Further, an inner circumferential face of the sealing ring and/or an inner circumferential face of the elastic gasket form(s) a guiding portion for inserting of the pipe, and an inner diameter of the gear ring is greater than a diameter of the inner circumferential face. In this way, it is beneficial for the insertion of the pipe, avoiding the possibility of scratches on the outer wall of the pipe caused by the embedded teeth during insertion.

Further, there are multiple rows of embedded teeth arranged along an axial direction of the gear ring. In this way, it is beneficial for improving the pull-out strength.

Further, the embedded teeth are set sequentially along a circumferential direction of the gear ring and spaced from each other. In this way, during the press-fitting process, as it is a process of circumferential folding, set sequentially circumferentially and spaced from each other is beneficial to prevent the embedded teeth from pushing against each other.

Further, a top of the embedded tooth is configured as a transverse blade tip. In this way, each embedded tooth is embedded into the outer wall of the pipe with a transverse angle, which is conducive to generating stronger obstruction and strength in the axial direction, thereby greatly improving the tensile resistance performance.

1, pipe coupling;
2, sealing ring;
3, gear ring;
4, elastic gasket;
5, embedded tooth;
6, circumferential groove on inner surface;
7, outer end face;
8, outer sidewall;
9, inner sidewall;
10, bottom face;
11, position-avoiding face;
12, transverse blade tip;
13, pipe.

DESCRIPTION OF THE EMBODIMENTS

For better understanding the present application, more detailed description of various aspects of this application will be provided with reference to the append drawings. It should be understood that these detailed description are only description of exemplary embodiments of the present application, and do not limit the scope of the present application in any way. In the whole specification, the same reference numbers refer to the same components.

In the attached drawings, for the sake of description, the thickness, size, and shape of the object have been slightly exaggerated. The attached drawings are only an example and not strictly drawn to scale.

It should also be understood that the terms "includes/include/including", "comprises/comprise/comprising", "has/have/having", used in this specification indicate the existence of the described features, structure, step, operation, component, and/or member, but do not exclude the existence or addition of one or more other features, structure, step, operation, component, member, and/or their combination.

Figure 1:
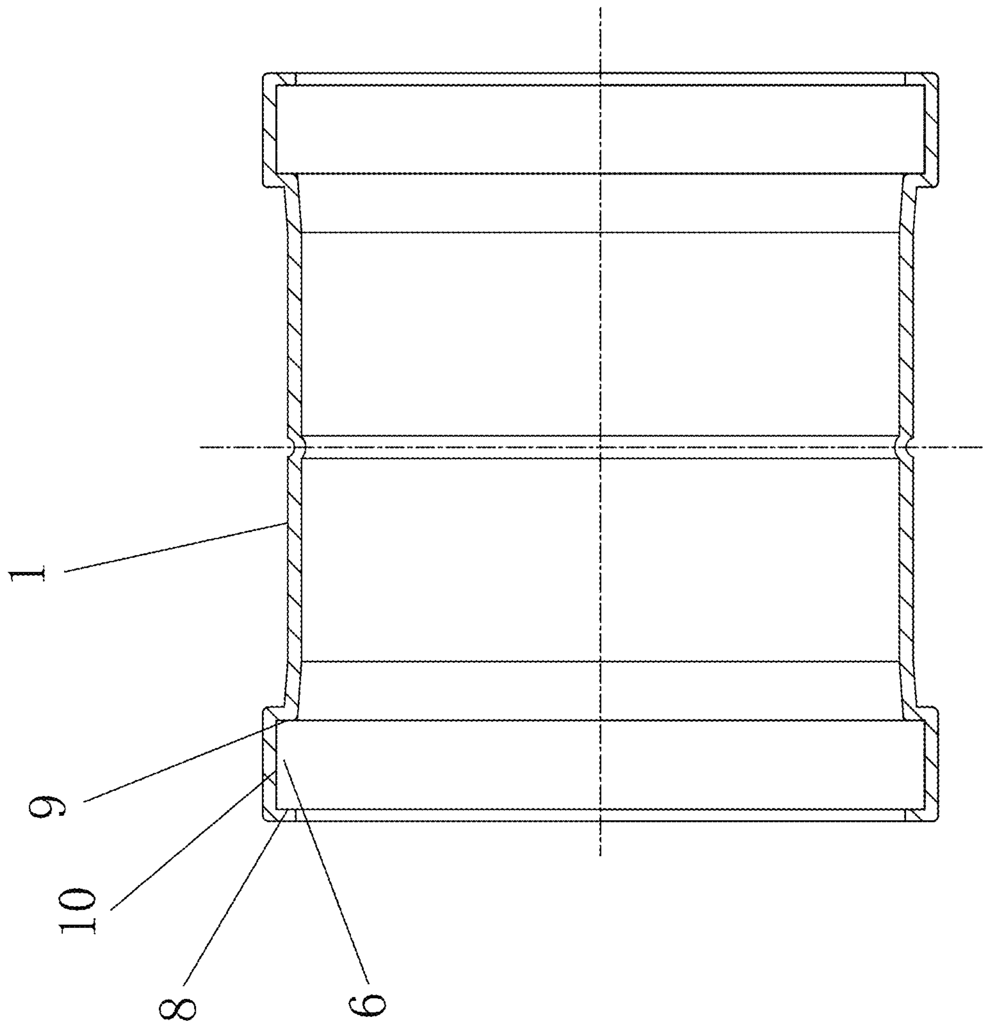
FIG. 1 is a schematic, cross sectional view of a press-fitting joint for combined pipeline of this disclosure, wherein gear ring, elastic gasket and sealing ring are not mounted.
Figure 2:
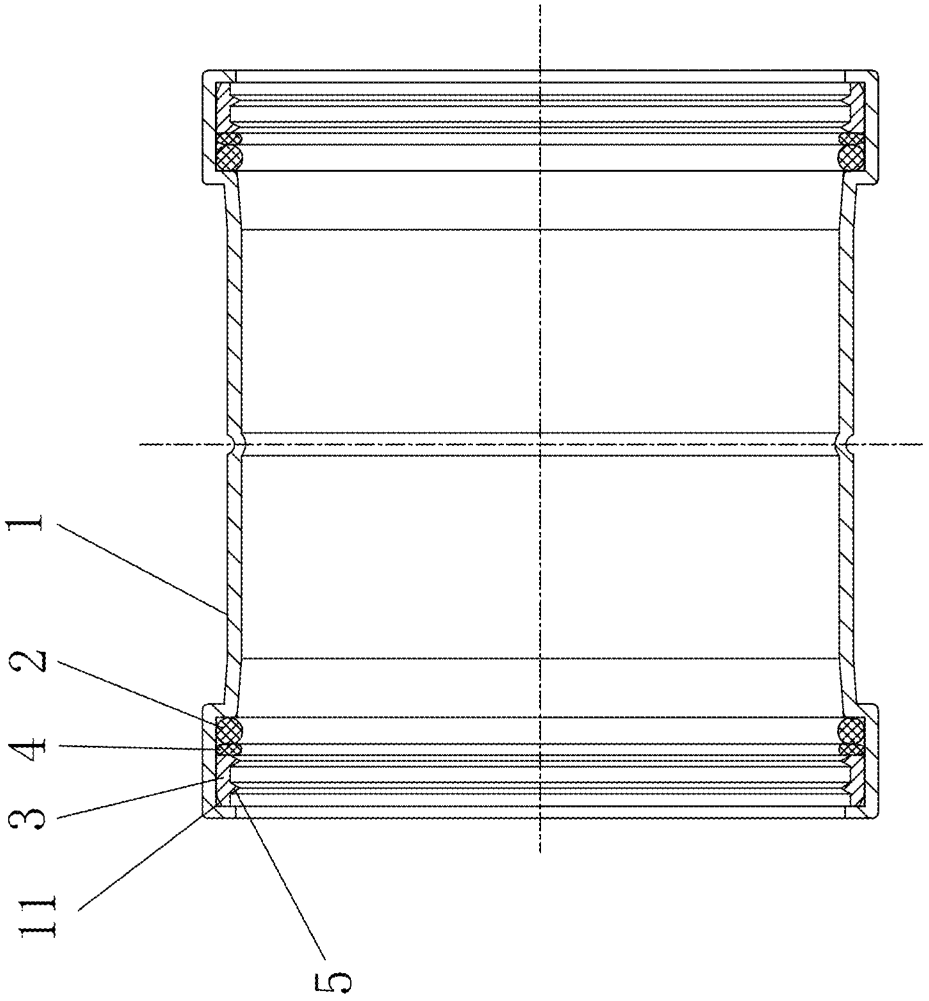
FIG. 2 is a schematic, cross sectional view of the press-fitting joint for combined pipeline of this disclosure, wherein gear ring, elastic gasket and sealing ring are mounted.
Figure 3:
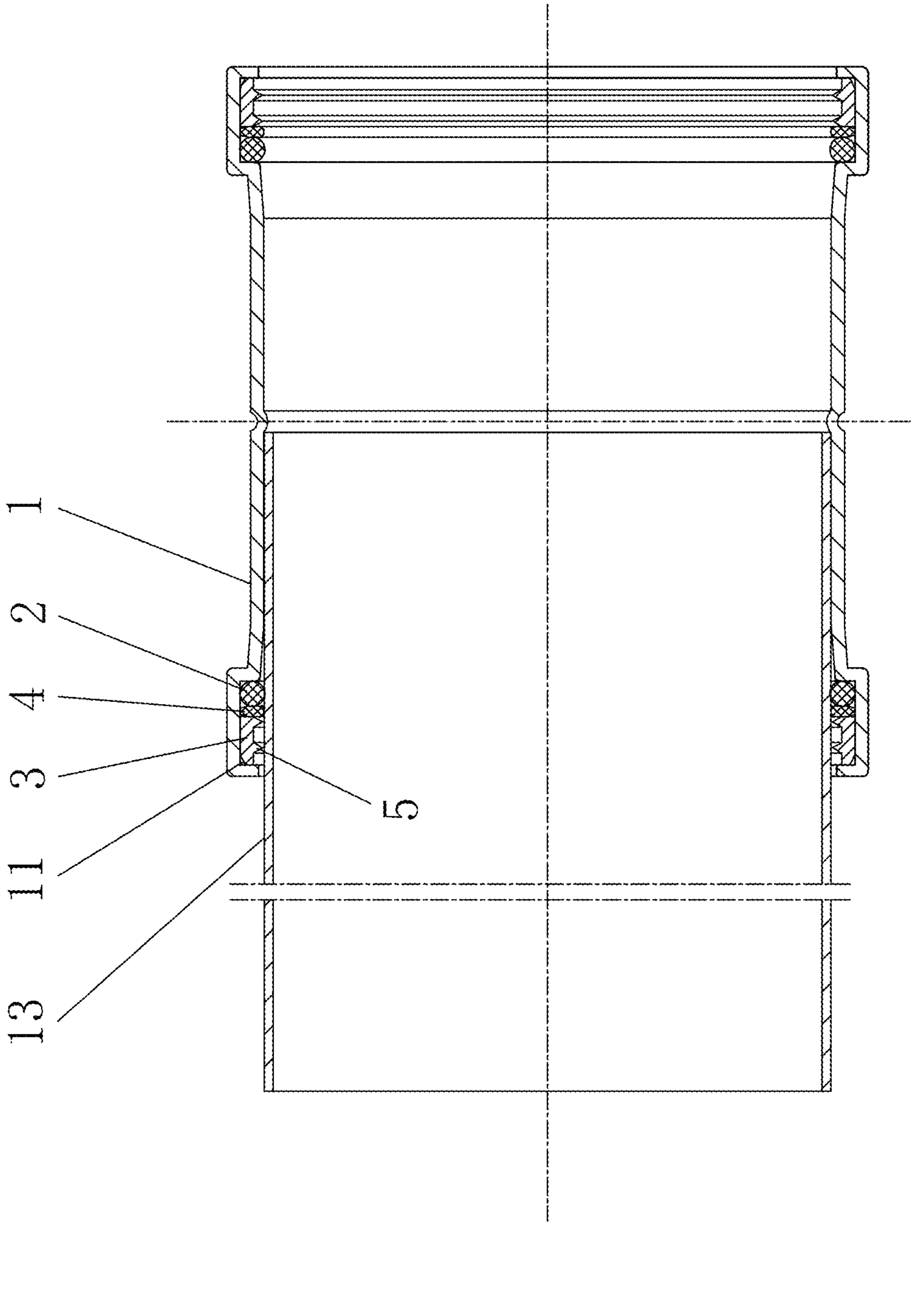
FIG. 3 is a schematic, cross sectional view showing that a pipe is inserted into the structure of FIG. 2.

As shown in FIG. 1 to FIG. 3, this embodiment discloses a press-fitting joint for combined pipeline, which connects pipes 13, for example, copper pipes, in a press-fitting manner. The press-fitting joint for combined pipeline uses, for example, a copper pipe.

Figure 4:
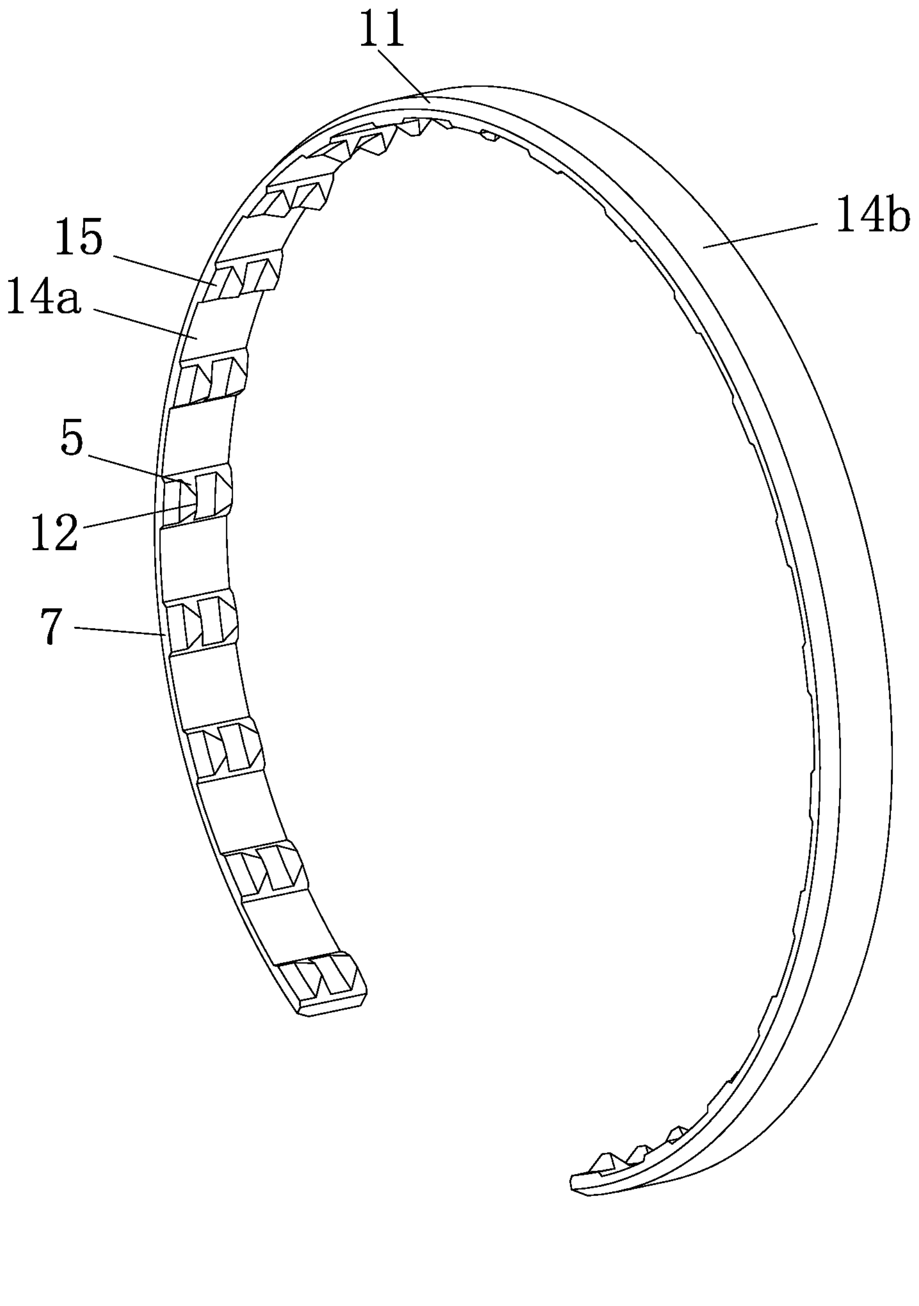
FIG. 4 is a schematic view of an embodiment of the gear ring.
Figure 5:
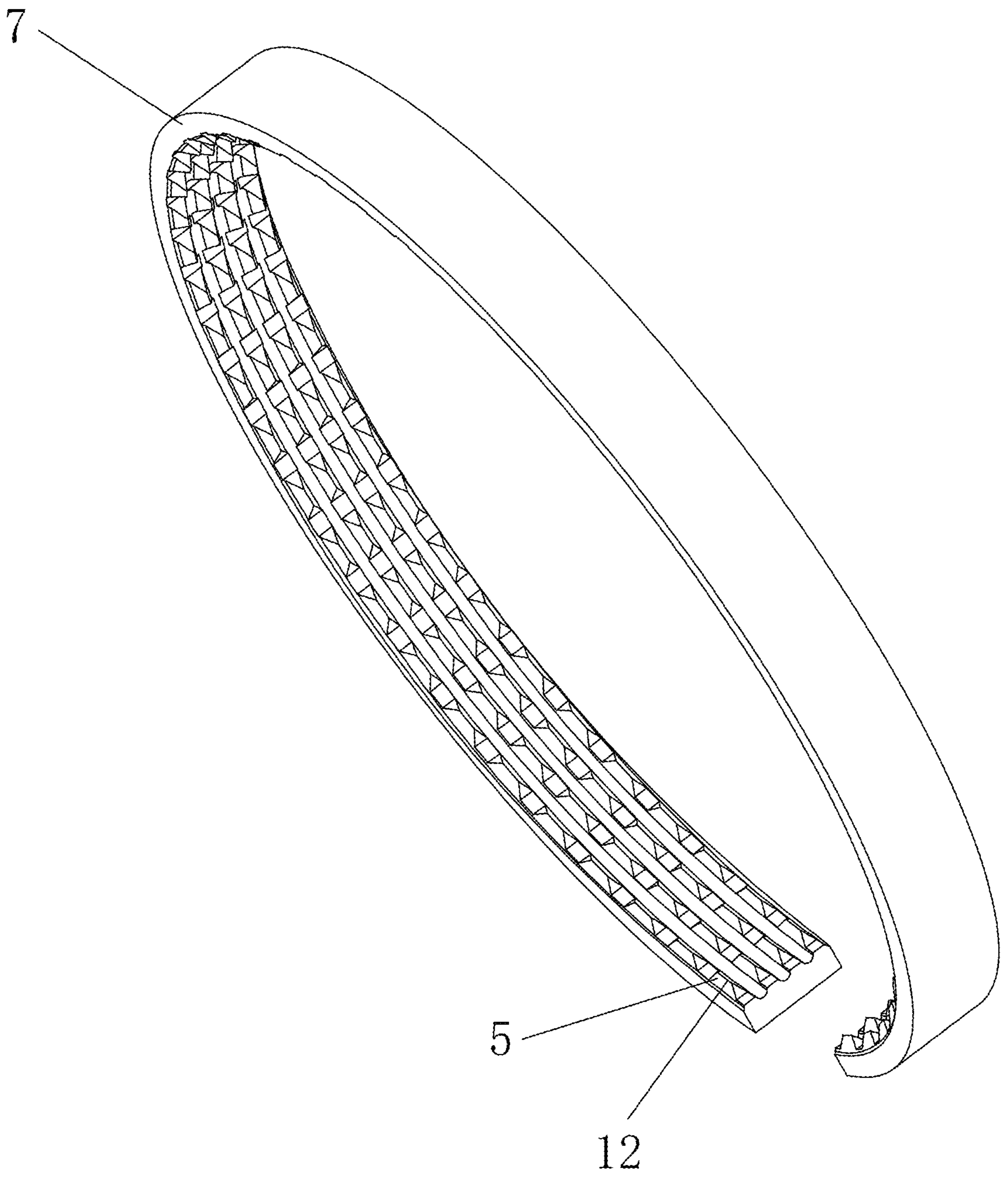
FIG. 5 is a schematic view of another embodiment of the gear ring.

The press-fitting joint for combined pipeline includes a pipe coupling 1, a gear ring 3, an elastic gasket 4, and a sealing ring 2. As shown in FIG. 4 or FIG. 5, an inner circumferential face 14*a* of the gear ring 3 is provided with a plurality of embedded teeth 5 which is arranged towards an axis. A press-fitting section of the pipe coupling 1 is provided with a circumferential groove 6 on an inner surface thereof, and the sealing ring 2, the elastic gasket 4, and the gear ring 3 are mounted in the circumferential groove 6 on inner surface and arranged sequentially along an axial direction from an outer side to an inner side. An outer end face 7 of the gear ring 3 is axially matched with an outer sidewall 8 of the circumferential groove 6 on inner surface, and an inner sidewall 9 of the circumferential groove 6 on inner surface is axially matched with the sealing ring 2. An outer circumferential face 14*b* of the gear ring 3, an outer circumferential face of the elastic gasket 4, and an outer circumferential face of sealing ring 2 are all in contact and matched with a bottom face 10 of the circumferential groove 6 on inner surface. The gear ring 3 has a plurality of thickened portions 15 on the inner circumferential face 14*a*, the thickened portions 15 are spaced apart in a circumferential direction of the gear ring 3, and the embedded teeth 5 are provided on the thickened portions 15 respectively.

In this embodiment, the elastic gasket 4 is a rubber ring, such as a rubber flat gasket.

In some embodiments, as shown in FIG. 2, FIG. 3 and FIG. 4, the outer circumferential face of the gear ring 3 is provided with a position-avoiding face 11 which is narrowed circumferentially at a portion thereof adjacent to the outer end face 7.

In this embodiment, each of the embedded teeth 5 is set to avoid a portion of the inner face of the gear ring 3 corresponding to the position-avoiding face 11.

Preferably, inner circumferential faces of the sealing ring 2 and elastic gasket 4 form a guiding portion for inserting of the pipe 13, and an inner diameter of the gear ring 3 is greater than a diameter of the inner circumferential face. Of course, it may also be the inner circumferential face of the sealing ring 2 or the inner circumferential face of the elastic gasket 4 that forms the guiding portion for inserting of the pipe 13.

In some embodiments, there are multiple rows of embedded teeth 5 arranged along an axial direction of the gear ring 3. As shown in FIG. 4, there are two rows of embedded teeth 5. As shown in FIG. 5, there are four rows of embedded teeth 5.

As shown in FIG. 4 or FIG. 5, the embedded teeth 5 are set sequentially along a circumferential direction of the gear ring 3 and spaced from each other. A gap between the embedded teeth 5 may be set according to need, which may be large or small.

As shown in FIG. 4 or FIG. 5, a top of the embedded tooth 5 adopts a transverse blade tip 12.

Transverse described above is relative to axial, and the ideal transverse direction is perpendicular to the axial direction. However, the transverse direction described in this disclosure not only includes the ideal transverse direction, but also includes the transverse direction that is inclined relative to the axial direction. Of course, it is better to be closer to the ideal transverse state.

When understanding the present application, if necessary, the above construction may be understood with reference to other embodiments/drawings, and will not be repeated here.

The above descriptions are only embodiments of the present application for illustrative purposes, so any equivalent changes or modifications made based on the structure, features, and principles in the protection scope of this application are included in the protection scope of this application.

What is claimed is:

1. A press-fitting joint for combined pipeline, comprising a pipe coupling, a sealing ring, a gear ring and an elastic gasket, wherein a press-fitting section is provided at an end of the pipe coupling, the press-fitting section defines a circumferential groove on a radial inner side thereof, the circumferential groove is defined between a first sidewall and a second sidewall that are located at opposite axial ends of the circumferential groove;

wherein the sealing ring, the elastic gasket, and the gear ring are mounted in the circumferential groove and arranged sequentially along an axial direction of the pipe coupling between the first sidewall and the second sidewall, the sealing ring axially abuts against the first sidewall, the gear ring has a distal end face axially abutting against the second sidewall, and an outer circumferential face of the gear ring contacts a radial inner surface of the press-fitting section at the circumferential groove;

wherein an inner circumferential face of the gear ring is provided with a plurality of rows of embedded teeth extending radially inwardly therefrom, and wherein the inner circumferential face at a distal portion of the gear ring corresponding to or adjoining the distal end face is provided with no embedded tooth;

wherein the outer circumferential face of the gear ring at the distal portion of the gear ring is configured as an inclined position-avoiding face and the inclined position-avoiding face extends radially inwardly in the axial direction of the pipe coupling towards the second sidewall, and wherein the gear ring has a thickness measured in a radial direction of the pipe coupling, and the thickness of the gear ring at the distal portion gradually reduces in the axial direction of the pipe coupling towards the second sidewall;

wherein the inclined position-avoiding face and the plurality of rows of embedded teeth are non-overlapping in the axial direction of the pipe coupling; and wherein the gear ring has a plurality of thickened portions on the inner circumferential face that are spaced apart in a circumferential direction of the gear ring, and the plurality of rows of embedded teeth are provided on the plurality of thickened portions respectively.

2. The press-fitting joint for combined pipeline according to claim 1, wherein the elastic gasket is a rubber ring.

3. The press-fitting joint for combined pipeline according to claim 1, wherein each embedded tooth of the plurality of rows of embedded teeth is a solid tooth, each embedded tooth has a width measured along the axial direction of the pipe coupling, and the width of each embedded tooth tapers radially inwardly to a sharp tip.

4. The press-fitting joint for combined pipeline according to claim 3, wherein a cross section of each embedded tooth along the axial direction of the pipe coupling is a triangle with an apex directed radially inwardly.

5. The press-fitting joint for combined pipeline according to claim 1, wherein an inner diameter of the gear ring is greater than a diameter of an inner circumferential face of the sealing ring and/or the elastic gasket.

6. The press-fitting joint for combined pipeline according to claim 1, wherein the embedded teeth in each row are set sequentially along the circumferential direction of the gear ring and spaced from each other.

7. The press-fitting joint for combined pipeline according to claim 6, wherein the plurality of rows of embedded teeth on the inner circumferential face of the gear ring are asymmetrically arranged with respect to a midpoint along its axial length.

8. The press-fitting joint for combined pipeline according to claim 7, wherein the plurality of rows of embedded teeth consists of a first row of embedded teeth arranged along the circumferential direction of the gear ring and a second row of embedded teeth arranged along the circumferential direction of the gear ring, the first row of embedded teeth adjoins an other end face of the gear ring opposite to the distal end face, and the second row of embedded teeth is spaced apart from the distal end face of the gear ring.

9. The press-fitting joint for combined pipeline according to claim 1, wherein each thickened portion is rectangular and is provided with two teeth of the plurality of rows of embedded teeth.

* * * * *